Dec. 26, 1961

J. W. HORTON ET AL 3,014,663

BINARY FULL ADDERS

Filed March 7, 1957

3 Sheets-Sheet 1

INVENTORS
JOHN W. HORTON
ARTHUR G. ANDERSON

BY Albert R. Hodges
ATTORNEY

Dec. 26, 1961 J. W. HORTON ET AL 3,014,663

BINARY FULL ADDERS

Filed March 7, 1957 3 Sheets-Sheet 2

INVENTORS
JOHN W. HORTON
ARTHUR G. ANDERSON
BY Albert R. Hodges
ATTORNEY

BINARY FULL ADDERS

Filed March 7, 1957 3 Sheets-Sheet 3

INVENTORS
JOHN W. HORTON
ARTHUR G. ANDERSON

BY Albert R. Hodges
ATTORNEY 3,014,663

BINARY FULL ADDERS

John W. Horton and Arthur G. Anderson, New York, N.Y., assignors to International Business Machines Corporation, New York, N.Y., a corporation of New York Filed Mar. 7, 1957, Ser. No. 644,509
10 Claims. (Cl. 235—176)

This application is a continuation-in-part of application Serial No. 556,002 filed December 28, 1955, now abandoned, which invention relates to binary full adders, and more particularly to such adders utilizing devices having a bounded negative-resistance characteristic.

A "binary full adder" is a familiar type of arrangement for adding in binary notation three binary input digits, that is, two digits to be added and a carry digit from a previous addition, and providing the correct sum and carry output signals. To do this, as is well known, the arrangement must provide a sum output signal only in response to a representation of either one or three input digits, and a carry output only in response to a representation of either two or three input digits.

A device may be referred to as having a bounded negative-resistance characteristic when a portion of its current-voltage characteristic has a negative slope and this portion of the characteristic lies between two portions each having a positive slope.

The principal object of the present invention is to provide an improved binary full adder of simplified construction compared with previously known arrangements.

Another object is to provide a novel binary full adder utilizing the bounded negative-resistance characteristic of one or more devices in performing the addition.

A further object is to provide a binary full adder utilizing, to perform the addition, a pair of devices, the conductivity of each of which is individually determined by the input signal and at least one of which has a bounded negative-resistance characteristic.

Still another object is to provide an adder in which two devices, each individually having two stable states, are combined in a novel fashion to provide an arrangement having four stable states suitable for full binary addition.

Still another object is to provide a binary full adder utilizing one or more positive-gap diodes to perform the addition.

In accordance with the present invention, there is provided apparatus comprising a combination of several structural elements. These elements include a pair of electrically conductive devices each individually having two stable current-voltage states, means coupling these devices to form a circuit having four stable current-voltage states made up of a combination of the individual states of the devices, means for applying input signals of different magnitudes to this circuit whereby it assumes one of the last-mentioned four states, and output means associated with each of the devices to provide a manifestation of the stable-state condition of the corresponding device. One or more of the above-mentioned devices may comprise a positive-gap diode.

Another feature of the present invention is the provision of a binary full adder which does not require separate means for suppressing the sum output when the input signal represents the presence of two input digits.

In accordance with a further feature of the present invention, a pair of devices each having a current-voltage characteristic a bounded portion of which has a negative slope, may be employed. The above-mentioned pair of devices may be effectively connected in parallel or effectively connected in series.

In accordance with still another feature of the present invention, one of the paired devices may comprise a device having a bounded negative-resistance characteristic and the other device may comprise a sharp-cutoff electron discharge device.

A further feature of the present invention is that one of the electrically conductive devices may comprise a secondary-emission pentode utilizing positive feedback to provide a bounded negative-resistance portion in its current-voltage characteristic.

Other objects and features of the present invention will be pointed out in the following description and claims and illustrated in the accompanying drawings, which disclose, by way of example, the principle of the invention and the best mode, which has been contemplated, of applying that principle.

In the drawings, in which like reference numerals designate like components:

Figures 1, 2A, 2B, 2C:
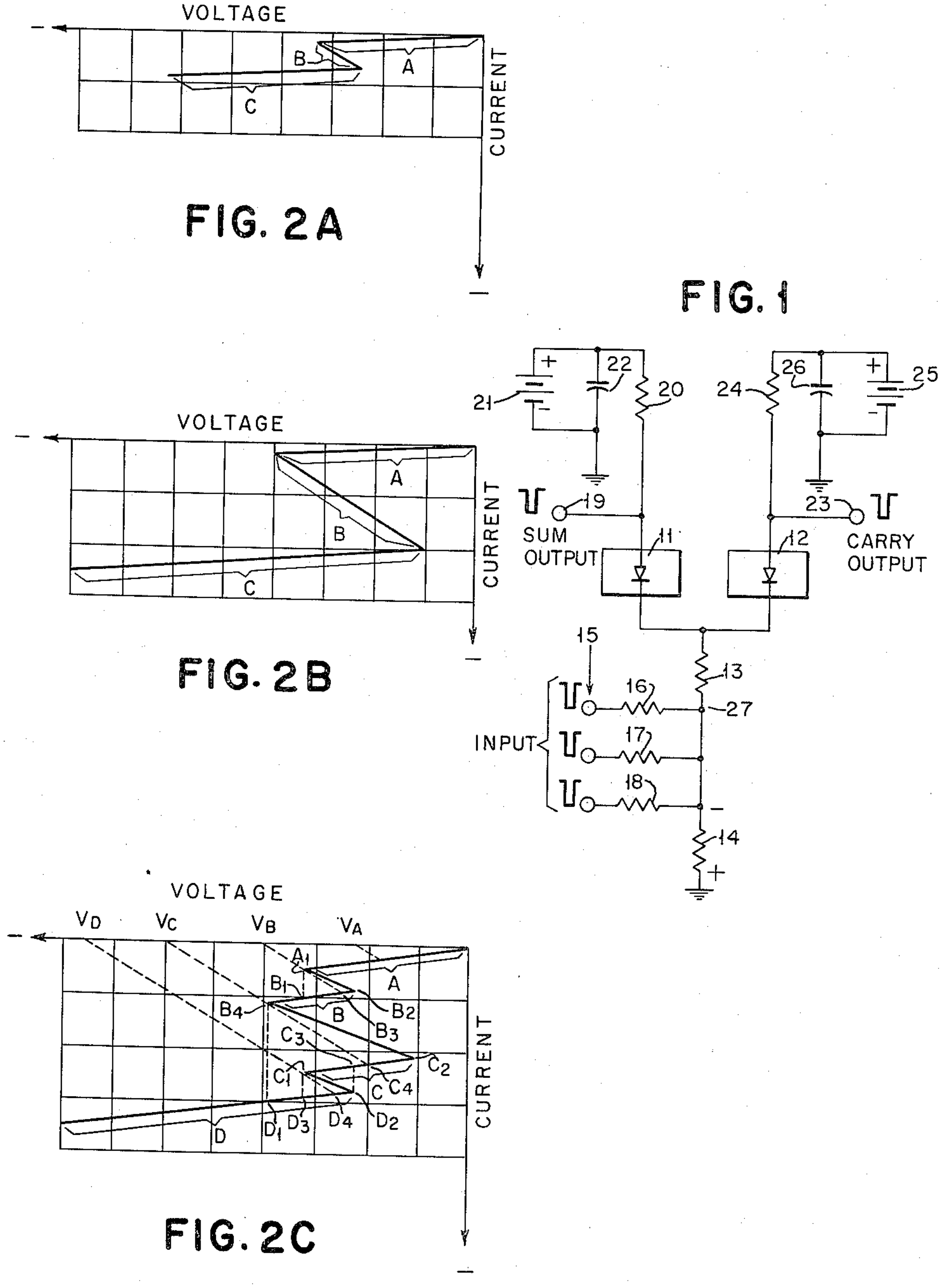
FIG. 1 is a schematic circuit diagram of a binary full adder in accordance with the present invention.
FIGS. 2A and 2B illustrate graphically the approximate current-voltage characteristics of certain portions of the arrangement of FIG. 1.
FIG. 2C is a graphical composite of FIGS. 2A and 2B, illustrating the operation of the binary full adder of FIG. 1.

Referring now to FIG. 1 of the drawings, there is shown a binary full adder utilizing a pair of positive-gap diodes 11 and 12 with resistors 20 and 24 respectively associated therewith in series. The diodes 11 and 12 combined with their respective associated resistors 20 and 24 are selected to have characteristics approximately of the type shown respectively in FIGS. 2A and 2B. As thus measured, the resultant characteristics each have a bounded negative-resistance portion. More specifically, each characteristic has a first stable region of relatively low current, designated A; an intermediate unstable portion B having a negative slope; and a second stable region of relatively high current, designated C. It will also be apparent from a comparison of FIGS. 2A and 2B that the two characteristics differ in that an appreciably larger voltage must be applied to the combination of diode 12 and resistor 24 (FIG. 2B) to shift it from its low-current region to its high-current region than that required to perform the same shift in the combination of diode 11 and resistor 20 (FIG. 2A). Advantage is taken of this difference in these characteristics in achieving the objectives of the present invention.

As shown in FIG. 1, the diodes are positive-gap diodes, selected to have with their associated resistors, approximately the characteristics illustrated respectively in FIGS. 2A and 2B. Suitable devices of this general type are described, for example, in a paper entitled "Germanium Positive-Gap Diode: New Tool for Pulse Techniques" by A. H. Reeves and R. B. W. Cooke, appearing at pages 112–117 of Electrical Communication for June 1955. In place of diodes 11 and 12 and their associated resistors, one could equally well utilize positive-feedback tube or transistor circuits, the former arrangement being well known and examples of the latter arrangement being described in a paper entitled "The Transistor as a Network Element" by J. T. Bangert, appearing at pages 329–352 of The Bell System Technical Journal for March 1954. It will be understood, of course, that other suitable arrangements capable of providing approximately the characteristics illustrated in FIGS. 2A and 2B may be utilized instead of the components just mentioned, without departing from the scope of the present invention. For convenience, therefore, the term "device" is used to designate an arrangement, comprising one or more circuit components, which provides a graphically specified characteristic.

The lower or cathode terminals of diodes 11 and 12 are common, since they are connected together and, through resistors 13 and 14, to ground. Three input terminals collectively designated by reference numeral 15 are connected through individual resistors 16, 17 and 18 to the junction of resistors 13 and 14. Resistors 16, 17 and 18 each have a resistance value substantially greater than that of resistor 14. Resistors 14 and 16–18 in combination serve as a summing network for the purpose of providing an input signal or potential, appearing as a voltage drop across resistor 14, which represents the approximate sum of any input voltages which may be applied to input terminals 15. It will be understood that any other suitable summing network may be substituted for the one here shown and described by way of example without departing from the scope of the present invention.

The upper or anode terminal of diode 11 is connected to a sum output terminal 19 and, through a resistor 20 and a source of bias potential represented by battery 21, to ground. Bias potential source 21 is shunted by a capacitor 22. Similarly, the upper or anode terminal of diode 12 is connected to a carry output terminal 23 and, through a resistor 24 and a bias potential source 25, to ground. Bias potential source 25 is shunted by a capacitor 26. Thus diodes 11 and 12, each with its associated resistor, are effectively connected in parallel for alternating current.

With the various polarities shown in FIG. 1, the system is adapted to respond to negative-going input signals of substantially equal amplitudes applied to terminals 15. It will be understood that the utilization means which output terminals 19 and 23 are adapted to feed should be so arranged as to respond only to usable output signals which have a predetermined minimum amplitude and hence to be nonresponsive to residual output signals which have no significance.

When diodes 11 and 12 are thus effectively connected in parallel as shown in FIG. 1, the total current flowing in the parallel circuit is the total of the current of FIGS. 2A and 2B, and is represented by the composite curve of FIG. 2C. This curve is developed by using voltage values common to FIGS. 2A and 2B and, for each such voltage value, adding the respective current values of the characteristics of FIGS. 2A and 2B to provide the corresponding ordinate or current values for the curve of FIG. 2C. Since the curves of FIGS. 2A and 2B are different, as explained above, although each has two stable states or regions, the composite curve of FIG. 2C has four stable states and three negative-slope portions. In accordance with the invention, these properties of the combined characteristic are utilized to provide a binary full adder, as will be explained below.

The broken lines in FIG. 2C represent some of the different positions which may be assumed by the load line. The slope of the load line is determined principally by the value of the common load or coupling resistor 13, and the point at which the load line intersects the voltage axis is determined by the potential present across resistor 14. It will be understood that, initially, the curves of FIGS. 2A and 2B may be displaced horizontally to desired relative positions by suitable choice of the potentials respectively of bias potential sources 21 and 25, so that the desired composite characteristic having four stable regions or states is realized, as shown in FIG. 2C, when the individual current values are added. The values of bias potential sources 21 and 25 also determine the potential drop across resistor 14 in the absence of input signals at input terminals 15.

The arrangement of FIG. 1 has four stable conditions of operation. These are designated respectively A, B, C and D, and the corresponding operating regions are thus indicated in FIG. 2C. When no negative-going signal voltages are applied at input terminals 15, the system is in stable condition A, and no usable output pulses are developed at sum and carry output terminals 19 and 23. When one input pulse is applied at terminals 15, the system assumes stable condition B and supplies a usable output pulse at sum output terminal 19. When two input pulses are applied at terminals 15, stable condition C is realized, and a usable output pulse appears at carry output terminal 23. When input pulses are applied to all three of terminals 15, the system assumes stable condition D, and develops a usable sum output pulse at terminal 19 and a usable carry output pulse at terminal 23. Just how each of these conditions is realized will now be explained.

When no signal voltages are applied at input terminals 15, only a small current flows in devices 11 and 12, as indicated by the low-current portions A of the curves of FIGS. 2A and 2B, respectively. This current flow is due to the presence of bias potential sources 21 and 25, and its total value is insufficient to cause any significant output voltage to be developed at either sum output terminal 19 or carry output terminal 23. As shown in FIG. 2C, this is stable condition A of operation, with the initial operating point at a value $V_A$, for example.

Let is now be assumed that a negative-going input voltage pulse is applied to one of input terminals 15 and that its value is so chosen that the voltage at junction 27 equals the valve $V_B$ (FIG. 2C). Thus the voltage across the devices including diodes 11 and 12 slightly exceeds the high-voltage end of the low-current region A (FIG. 2A) of the device including diode 11, as represented by point $A_1$ in FIG. 2C, but does not exceed the high-voltage end of the low-current region A (FIG. 2B) of the device including diode 12, as represented by point $B_4$ in FIG. 2C. Under this condition as the input pulse is applied, the presence of stray capacitance across the parallel combination of the devices causes the current to increase instantaneously from its value at point $A_1$ to the value at point $B_1$. Thereupon the current decreases along portion B of the curve of FIG. 2C until it reaches its equilibrium value at point $B_3$. The applied input voltage could have a value greater than that of $V_B$ but less than that of $V_C$, and a corresponding equilibrium point on portion B of the composite curve would be reached.

Under this condition B of operation, the path through diode 11 is rendered highly conductive, since operation is now in the high-current region C of its characteristic as shown in FIG. 2A; and the path through diode 12 is rendered only slightly more conductive, in that operation is still in the low-current region A of its curve as shown in FIG. 2B. As a high current flows in the path of diode 11, there is then a substantial voltage drop across resistor 20, so that a usable sum output signal pulse is developed at sum output terminal 19. Because of the relatively low current in the parallel path through diode 12, however, no significant output pulse is developed at carry output terminal 23 under this condition of operation.

When two input pulses are applied at terminals 15, the voltage at junction 27 at least equals the value $V_C$ as indicated in FIG. 2C. In this case, the voltage across the parallel combination of devices including diodes 11 and 12 slightly exceeds that at point $B_4$ and, due to stray capacitance across these devices, the current increases instantaneously but only momentarily to that at point $D_1$. As the stray capacitance discharges, the current immediately decreases along the portion D of the characteristic curve until the point $D_2$ is reached. The portion D in FIG. 2C corresponds to the high-current regions C of the characteristics of the devices including diodes 11 and 12, shown separately in FIGS. 2A and 2B. Since this simultaneous relatively high conduction of the devices represents a greater current value than the equilibrium value, it cannot be maintained. Accordingly, a transition occurs from point $D_2$ to point $C_3$ on the C portion of the composite characteristic. The latter portion comprises the low-current region A (FIG. 2A) of the characteristic of the device including diode 11 and the high-current region C (FIG. 2B) of the characteristic of the device including diode 12. Equilibrium is reached by the final discharge of the stray capacitance, the current following the C portion of the composite characteristic until the equilibrium point $C_4$ at the intersection of this portion with the load line corresponding to voltage $V_C$ is reached. The applied voltage could have a value greater than that of $V_C$ but less than that to $V_D$, and a corresponding equilibrium point on portion C of the composite curve would be reached. In other words, the increase of the voltage of junction 27 to a value higher than value $V_C$ but less than that of $V_D$ causes a transition from the B portion to the C portion of the characteristic in accordance with the current summation of the two curves (FIGS. 2A and 2B). In this stable C condition, the device with diode 12 is in its high-current condition and the device with diode 11 is in its low-current condition. Thus a usable output signal pulse is developed at carry output terminal 23, but no significant signal pulse appears at sum output terminal 19. This result is thus achieved without requiring separate means for suppressing the sum output, in accordance with an important feature of the present invention.

When three input pulses are applied to input terminals 15, a voltage equal to the voltage $V_D$ (FIG. 2C) is present at junction 27, causing the circuit of FIG. 1 to assume stable condition D. In this stable condition, both of the parallel paths are in their high-current conditions (portions C in FIGS. 2A and 2B), so that usable output pulses are developed both at sum output terminal 19 and at carry output terminal 23. When the voltage $V_D$ is applied, the voltage across the combination of the devices slightly exceeds the voltage at point $C_1$ and, due to the presence of stray capacitance, the current rises instantaneously to the value at point $D_3$. Thereupon the stray capacitance discharges and the current flow follows portion D of the characteristic to its equilibrium point $D_4$, this point being the intersection of the load line corresponding with the voltage $V_D$ and portion D of the characteristic curve. If the applied voltage is higher than $V_D$, the corresponding equilibrium point on portion D is reached.

It is to be clearly understood that the foregoing explanation of the arrangement of FIG. 1 has assumed instantaneous switching transitions in the devices including diodes 11 and 12 and the presence of significant stray capacitance. In practical embodiments of the present invention, devices may be employed which have transition times sufficiently long that the stray capacitance may be considered to have a negligible effect. In such a case, the higher-current stable conditions, that is, conditions B, C and D, are reached by the passing of the system along the negative-resistance portions of the characteristic shown in FIG. 2C, represented respectively by portions of the characteristic lying between points $A_1$ and $B_2$, $B_4$ and $C_2$, and $C_1$ and $D_2$. Furthermore, in the foregoing explanation it has been assumed that perfectly square pulses are applied to input terminals 15. It will be readily understood by those skilled in the art that, if this condition is not met in practice, to reach a higher-current stable condition, that is, to go from condition A to condition B, C or D, will necessitate passing through the lower-current stable conditions on the way. Likewise, when the circuit is returning to its initial stable condition A from a higher-current condition, all intermediate stable conditions will also be traversed if the decreasing voltage is not of square waveform.

It will be apparent from the above description of the operation of the arrangement of FIG. 1 that there has been provided a binary full adder, since the sum output signal is produced in response to the presence of an input signal representing one or three input digits and is otherwise not present, and the carry output signal is produced in response to the presence of an input signal representing two or three input digits and is otherwise not present.

Figure 3:
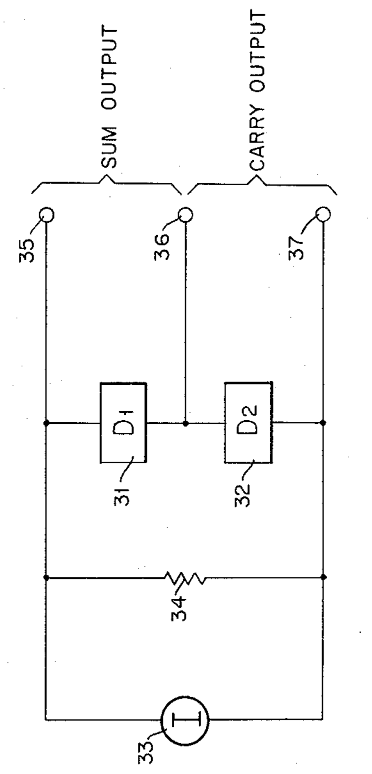
FIG. 3 is a schematic circuit diagram of a modified form of the present invention.

FIG. 3 of the drawings shows a modified form of the invention in which a pair of devices 31 and 32, each having a bounded negative-resistance characteristic, are connected in series across an input signal source 33. This arrangement is adapted to utilize current pulses instead of the voltage pulses used in FIG. 1. The characteristics of devices 31 and 32 are approximately as illustrated respectively in FIGS. 4A and 4B. As shown, each characteristic has a first stable region of relatively low voltage drop, designated A; an intermediate unstable portion B having a negative slope; and a second stable region of relatively high voltage drop, designated C. It will also be apparent from a comparison of FIGS. 4A and 4B that an appreciably larger current must pass through device 32 (FIG. 4B), used in developing the carry output, to shift it from its low-voltage region to its high-voltage region than that required to perform the same shift in device 31 (FIG. 4A), used in developing the sum output. Advantage is taken of this difference in these characteristics in achieving the objectives of the present invention.

Figure 4C:
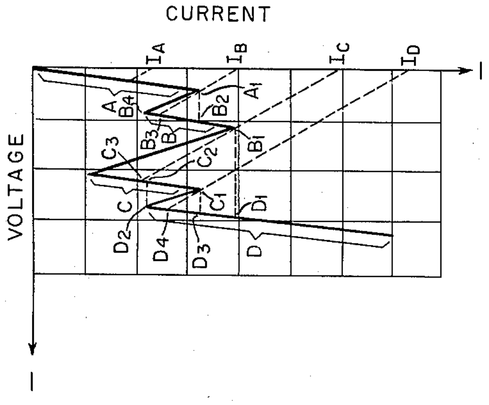
FIG. 4C is a graphical composite of FIGS. 4A and 4B, illustrating the operation of the arrangement of FIG. 3.
Figure 4B:
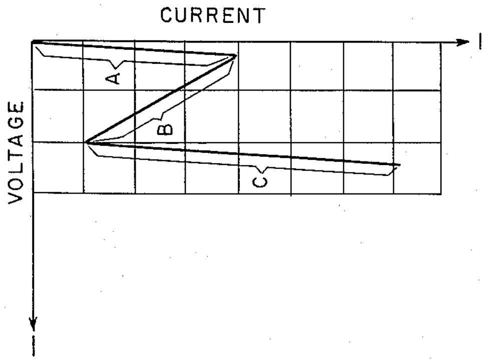
FIGS. 4A and 4B illustrate graphically the approximate current-voltage characteristics of certain portions of FIG. 3.
Figure 4A:
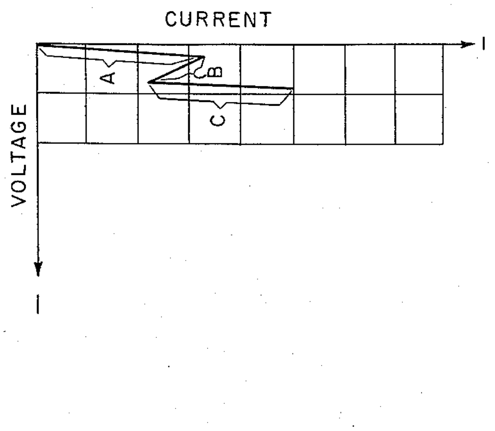

FIG. 4C is a composite graph illustrating the operation of the arrangement of FIG. 3. This curve is developed by using current values common to FIGS. 4A and 4B, for each such current value, adding the respective voltage values of the characteristics of FIGS. 4A and 4B to provide the corresponding abcissa or voltage values for the curve of FIG. 4C. Since the curves of FIGS. 4A and 4B are different, as explained above, although each has two stable states or regions, the composite curve of FIG. 4C has four stable states and three negative-slope portions. In accordance with the invention, these properties of the combined characteristic are utilized to provide a binary full adder, as will be explained below.

As in the embodiment of FIG. 1, devices 31 and 32 each may comprise any suitable arrangement, as for example a positive-gap diode circuit, a dynatron or a positive-feedback tube or transistor circuit, which is capable of providing substantially the indicated characteristics. Source 33 may comprise any conventional arrangement for combining a plurality of input signals to produce a current pulse the value of which depends upon how many of the input signals are simultaneously present. Since this device forms no part of the present invention, it is unnecessary to show it in detail. Source 33 is shunted by a resistor 34, the value of which determines the slope of the several load lines indicated by broken lines in FIG. 4C. The sum output voltage signal is developed between terminals 35 and 36 associated with device 31, and the carry output voltage signal is developed between terminals 36 and 37 associated with device 32. As in the case of FIG. 1, it will be understood that the utilization means to be fed respectively from output terminals 35 and 36 and output terminals 36 and 37 of FIG. 3 are so arranged as to respond only to usable output signals which have a predetermined minimum amplitude and hence to be non-responsive to residual output signals which have no significance.

Since devices 31 and 32 of FIG. 3 are in series, the current through both of these devices is always the same. With different values of current input from source 33, however, the voltage across devices 31 and 32 will vary individually in accordance with the volatge summation curve of FIG. 4C. As in the case of the arrangement of FIG. 1, the system of FIG. 3 has four stable conditions of operation. These are designated respectively A, B, C and D, and the corresponding operating regions are thus indicated in FIG. 4C.

Stable condition A is realized when the current from source 33 is at its lowest value. This value may be indicated, for example, by the value $I_A$ in FIG. 4C. Under this condition of operation, devices 31 and 32 are both operating on the low-voltage portions A of their characteristics (FIGS. 4A and 4B), so that the voltage across each of these devices is insufficient to produce a usable output signal at either the sum output or the carry output terminals. When a first value of current due to the presence of a single input signal is applied from source 33, the circuit is switched to stable condition B (FIG. 4C) to provide a usable sum output between terminals 35 and 36, but no significant carry output between terminals 36 and 37. In this case, the current through devices 31 and 32 in series is greater than that at point $A_1$ (corresponding to the high-current end of portion A of the characteristic of FIG. 4A) but less than that at point $B_1$ (corresponding to the high-current end of portion A of the characteristic of FIG. 4B). To realize this stable condition B, the total current supplied by source 33 must at least equal the value $I_B$ but be less than the value $I_C$ as indicated in FIG. 4C. The amplitude of the input signal is so chosen as to provide this total current. A portion of the total current passes through load or coupling resistor 34, and the remainder passes through devices 31 and 32 in series. When the current through the latter branch of the circuit slightly exceeds the value at point $A_1$, as it does when the total current is equal to $I_B$, the presence of stray inductance in series with devices 31 and 32 causes the total voltage across these devices to increase instantaneously to the point $B_2$. This voltage then decreases along portion B of the characteristic until the equilibrium point $B_3$ is reached. If the total current exceeds $I_B$ but is less than $I_C$, the corresponding equilibrium point on portion B will be reached. Under this B condition, device 31 is in its high-voltage operating region (portion C, FIG. 4A), whereas device 32 is still in its low-voltage operating region, as shown by portion A in FIG. 4B. Thus, a usable output signal is developed between sum output terminals 35 and 36, but no significant output signal appears between carry output terminals 36 and 37.

When two units of current are supplied by source 33 so that the total current at least equals $I_C$, the condition C is reached. In this case, device 31 is in its low-voltage operating region (portion A in FIG. 4A) and device 32 is in its high-voltage operating region (portion C in FIG. 4C). As the current through devices 31 and 32 exceeds the value at point $B_1$, the stray inductance in series with devices 31 and 32 causes the voltage to rise instantaneously but only momentarily to point $D_1$. Since the voltage is above the equilibrium value, it cannot remain at this point and hence immediately begins to decrease along portion D of the characteristic until the point $D_2$ is reached, whereupon it decreases instantaneously to the point $C_3$ and decreases further along portion C of the characteristic until the equilibrium point $C_3$ is reached. If the total current exceeds $I_C$ but is less than $I_D$, the corresponding equilibrium point on portion C will be reached. Under this C condition of operation, device 31 is in its low-voltage operating region and device 32 is in its high-voltage operating region. Accordingly, no appreciable output signal appears between sum output terminals 35 and 36, but a usable carry output signal is developed between carry output terminals 36 and 37. Here again, as in the arrangement of FIG. 1, this result is achieved, in accordance with an important feature of the present invention, without requiring separate means for suppressing the sum output.

The occurrence of three units of current in source 33 causes the total current to at least equal $I_D$, at which time the current through the series combination of devices 31 and 32 exceeds the value of point $C_1$. The presence of stray inductance in series with devices 31 and 32 causes the voltage across the devices 31 and 32 in series to increase instantaneously to the value at point $D_3$. The voltage then decreases along portion D of the characteristic until it reaches the stable point $D_4$. The total current may exceed $I_D$, in which case the corresponding equilibrium point on portion D will be reached. Under this D condition of operation, both of devices 31 and 32 are in their high-voltage operating region (portions C, FIGS. 4A and 4B), so that output signals are developed between sum output terminals 35 and 36, and between carry output terminals 36 and 37.

In this case also it has been assumed in the foregoing explanation of the arrangement of FIG. 3 that the switching transitions in the devices 31 and 32 occur instantaneously and that significant stray inductance is present. It has also been assumed that the input signal pulses are perfectly square in waveform. If these conditions do not exist in practice, the various stable regions of operation are reached by passing the system along the intermediate stable and negative-resistance portions of the characteristic of FIG. 4C.

Figures 5, 6A, 6B:
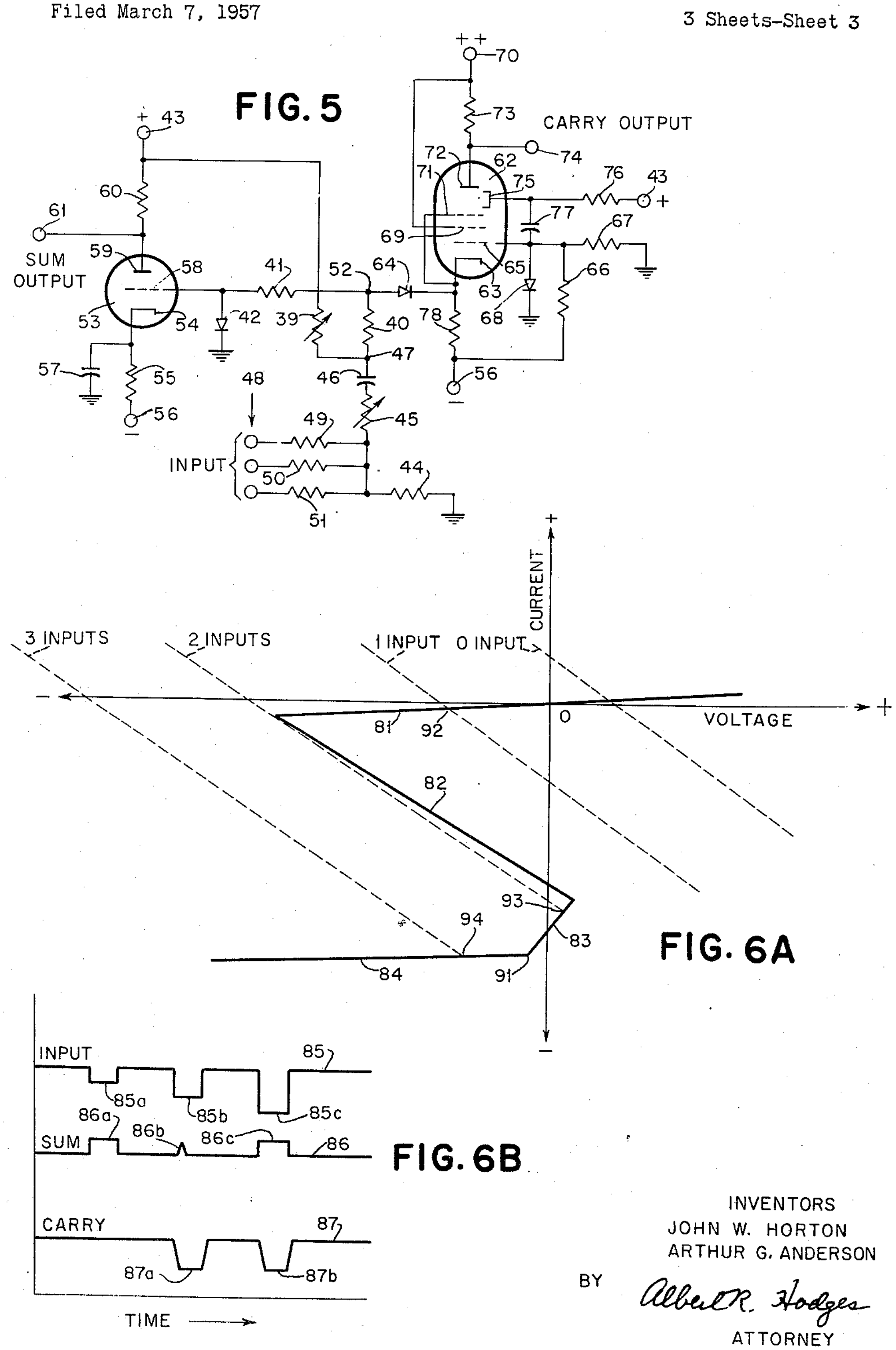
FIG. 5 is a schematic circuit diagram of another modification of the present invention.
FIGS. 6A and 6B are graphs illustrating the operation of the arrangement of FIG. 5.

FIG. 5 of the drawings is a schematic circuit diagram of a modified form of binary full adder in accordance with the present invention. In this embodiment, the sum output portion comprises a sharp-cutoff electron tube providing a characteristic having two stable states but no negative-slope portion, and the carry output portion comprises a secondary-emission pentode utilizing positive feedback to provide a characteristic having two stable states and a bounded negative-slope portion. Thus this embodiment is consistent with the requirement that, if only one of the two devices employed has a negative-slope portion in its characteristic, this device must be utilized to provide the carry output.

Referring to FIG. 5, there is shown a network comprising resistors 39 (preferably variable), 40 and 41 connected in series with a rectifier element or diode 42 between a source 43 of positive potential and ground. Resistors 44 and 45 (preferably variable) are connected in series with a capacitor 46 between ground and junction 47 of resistors 39 and 40. Three input terminals collectively designated by reference numeral 48 are connected through individual resistors 49, 50 and 51 to the junction of resistors 44 and 45.

Resistors 44 and 49–51 in combination serve as a summing network for the purpose of providing an input signal or potential, appearing as a voltage drop across resistor 44. This potential represents the approximate sum of any input voltages which may be applied to input terminals 48. The various circuit constants are so chosen that junction 52 between resistors 40 and 41 is substantially at ground potential in the absence of any input signal voltages at input terminals 48.

For the purpose of providing a sum output there is provided an electron discharge device 53, preferably a sharp-cutoff triode, as for example a type 5842. This tube and its associated components have two stable regions of operation, namely when the tube is conductive and when it is nonconductive. Cathode 54 of tube 53 is connected through a resistor 55 to a source 56 of negative potential. A capacitor 57 is connected between cathode 54 and ground. Grid 58 of tube 53 is connected to the junction of resistor 41 and diode 42. Anode 59 of tube 53 is connected through a resistor 60 to positive potential source 43, and the anode is also connected to a sum output terminal 61. The circuit constants are so chosen that, when junction 52 is substantially at ground potential, tube 53 is conductive so that its anode 59 and hence sum output terminal 61 are at a relatively low potential.

For the purpose of providing a carry output, there is provided an arrangement having a current-voltage characteristic a bounded portion of which has a negative slope. As shown in FIG. 5, this arrangement comprises a secondary-emission pentode 62, as for example a tube of the Philips EFP60 type. Cathode 63 of tube 62 is connected through a resistor 78 to negative potential source 56. A rectifier element or diode 64 is connected between junction 52 and cathode 63. Control grid 65 of tube 62 is connected to the junction of resistors 66 and 67, which are connected in series between negative potential source 56 and ground. A rectifier element or diode 68 is connected between control grid 65 and ground. Screen grid 69 of tube 62 is connected to a source 70 of relatively high positive potential. Suppressor grid 71 of tube 62 is connected to cathode 63.

Anode 72 of tube 62 is connected through a resistor 73 to positive potential source 70, and is also connected to a carry output terminal 74. Dynode 75 of tube 62 is connected through a resistor 76 to positive potential source 43. A coupling capacitor 77 is connected between dynode 75 and control grid 65. The circuit constants are so chosen that when junction 52 is substantially at ground potential, cathode 63 is also substantially at ground potential and control grid 65 is at a sufficiently negative potential with respect to ground to bias tube 62 to cutoff.

Resistor 40 provides a common coupling between the grid circuit of tube 53 and the input circuit of the arrangement including tube 62. It will be understood that the utilization means to be fed respectively from output terminals 61 and 74 should be so arranged as to respond only to usable output signals and hence to be non-responsive to residual or spurious output signals which have no significance.

The operation of the carry output portion of the arrangement of FIG. 5 will be more clearly understood by reference to FIG. 6A, which shows graphically an idealized current-voltage characteristic of this portion of the circuit as it is seen looking to the right from junction 52, it being understood that there is no appreciable current flow through resistor 41 and that a constant current, equal to the current through diode 64 and resistor 78 when junction 52 is at zero voltage, has first been subtracted in order to render clearer the similarity between this characteristic and the characteristic of a positive-gap diode arrangement such as that shown in FIG. 2B, for example.

Let it be assumed that tube 62 is initially non-conductive and that junction 52, initially substantially at ground potential, is made negative with respect to ground. This permits cathode 63, which is connected through resistor 78 to negative potential source 56, to also become negative with respect to ground, the cathode continuing to change its potential in this direction until its potential is substantially the same as that of control grid 65. This phase of the operating cycle is illustrated by portion 81 of the characteristic shown in FIG. 6A.

As cathode 63 drops to a potential more negative than that of control grid 65, electron current begins to flow from cathode 63 to dynode 75, and secondary electrons emitted from dynode 75 flow to plate 72. This emission of electrons causes dynode 75 to become increasingly positive. This potential change is passed through capacitor 77 to control grid 65, this positive feedback providing a high degree of regeneration and thus hastening the achievement of full conductivity. The resultant increase in cathode current causes the voltage drop across resistor 78 to increase, so that the potential of cathode 63 rises. The current through diode 64 decreases because an increasing share of the total current flows through cathode 63 instead of through diode 64. This in turn reduces the potential drop across resistor 40 and causes junction 52 to rise in potential, as illustrated by portion 82 of the characteristic of FIG. 6A. This phase of the operating cycle continues until control grid 65 rises substantially to ground potential, a level which it cannot exceed due to the presence of diode 68. The regeneration now ceases, and junction 52 is at its most positive potential, this point being represented by the junction of portions 82 and 83 of the characteristic of FIG. 6A. A further increase of the electron current from cathode 63 can occur only by a reduction of the cathode potential. This drop in the potential of cathode 63 causes a still further decrease in the current flowing through diode 64 and a decrease in the potential of junction 52. As indicated by portion 83 of the characteristic, the slope of this portion corresponds to the input resistance at cathode 63 in series with the forward resistance of diode 64. As the potential of junction 52 is further reduced, portion 83 intersects portion 84 of the characteristic (FIG. 6A), their junction 91 representing the point at which the current through tube 62 is equal to the current which had previously been flowing through diode 64 at the point represented in FIG. 6A as the zero-voltage, zero-current point. Further reduction of the potential at junction 52 follows along portion 84 of the characteristic, corresponding to the back-resistance characteristic of diode 64. Thus it will be seen that a device has been provided having a current-voltage characteristic abounded portion of which has a negative slope. The above description and the following explanation both assume that the time constants at cathode 54 of tube 53 and at dynode 75 of tube 62 are long compared with the signal pulse duration.

The operation of the circuit of FIG. 5 as a whole will now be considered, reference being made to FIGS. 6A and 6B. Curve 85 of the latter figure illustrates the progressively increasing input potentials developed across resistor 44 as one, two or three of input terminals 48 are supplied with input signal voltages. Consider first a case in which only a single input voltage is present, the resultant voltage across resistor 44 being illustrated by portion 85*a* of curve 85. Under this condition, junction 52 is driven from its normal level at substantially ground potential to a value sufficiently far in a negative direction to render tube 53 nonconductive. This causes the potential of anode 59 and hence of sum output terminal 61 to rise, resulting in a sum output signal pulse illustrated by portion 86*a* of curve 86 in FIG. 6B. This relatively small negative excursion of junction 52 is insufficient, however, to cause tube 62 to become conductive. This is clearly brought out in FIG. 6A, in which the "1 input" load line is seen to intersect the upper positive-slope portion 81 of the characteristic curve at point 92. Thus no output pulse is developed under this condition at carry output terminal 74, as clearly indicated by the undisturbed portion of curve 87 lying directly below portion 86*a* of curve 86.

Now let it be assumed that input voltages are applied to any two of input terminals 48, the resultant negative-going voltage developed across resistor 44 being illustrated by portion 85*b* of curve 85. The potential of junction 52 is driven in a negative direction. As indicated by the position of the "2 inputs" load line in FIG. 6A, tube 62 is thus rendered conductive and operation is now in the positive-slope portion 83 of the characteristic curve, so that a carry output signal pulse is developed at carry output terminal 74 as illustrated by portion 87*a* of curve 87 (FIG. 6B). The presence of the above-mentioned negative-going pulse at junction 52 is sufficient to momentarily cut off tube 53, thus producing a small spurious output pulse at sum output terminal 61, as illustrated by portion 86*b* of curve 86 in FIG. 6B. However, as soon as tube 62 completes its regenerative cycle and the circuit reaches its equilibrium point, represented by the relatively positive intersection 93 of the "2 inputs" load line with portion 83 of the characteristic of FIG. 6A, junction 52, as previously explained, again becomes sufficiently positive with respect to cathode 54 of tube 53 to restore the latter tube to its normally conductive state, thereby terminating spurious sum output pulse 86*b* before it has achieved any appreciable duration. As in the arrangements of FIGS. 1 and 3, this result is achieved, in accordance with an important feature of the present invention, without requiring separate means for suppressing the sum output.

Let it now be assumed that input signal voltages are applied to all three terminals 48, so that a relatively large negative-going potential, illustrated by portion 85c of curve 85, is developed across resistor 44. The resultant negative-going excursion of junction 52 causes tube 53 to become nonconductive, thus producing a sum output signal pulse at sum output terminal 61 as illustrated by portion 86c of curve 86. The negative-going excursion of junction 52 also causes tube 62 to go through its regenerative cycle, so that a carry signal output pulse is developed at carry output terminal 74, as depicted by portion 87b of curve 87. Operation in this case reaches equilibrium at the intersection 94 of the "3 inputs" load line with portion 84 of the characteristic of FIG. 6A. Under this condition, the equilibrium point is sufficiently negative to prevent tube 53 from returning to its normal conductive state.

In one particular embodiment of the invention in accordance with FIG. 1 which was specifically designed for operation in, and which operated successfully in, a system employing pulse durations of approximately $20 \times 10^{-9}$ second and respective input signal levels across resistor 14 of 15, 30 and 45 volts, the following values of constants were utilized:

| | |
|---|---|
| Resistor **13** | 400 ohms. |
| Resistor **14** | 46 ohms. |
| Resistor **20** | 250 ohms. |
| Resistor **24** | 56 ohms. |
| Capacitors **22** and **26** | 0.01 microfarad. |
| Bias source **21** | 0.0 volt. |
| Bias source **25** | 5.0 volts. |

In a successful embodiment of the invention in accordance with FIG. 5 of the drawings, the following values of constants and components were employed:

| | |
|---|---|
| Resistor **39** | 20,000 ohms (variable). |
| Resistor **40** | 680 ohms. |
| Resistors **41** and **73** | 1000 ohms. |
| Resistor **44** | 50 ohms. |
| Resistor **45** | 1000 ohms (variable). |
| Resistors **49**, **50**, **51** and **76** | 470 ohms. |
| Resistor **55** | 5000 ohms. |
| Resistor **60** | 220 ohms. |
| Resistor **66** | 18,000 ohms. |
| Resistor **67** | 2,200 ohms. |
| Resistor **78** | 10,000 ohms. |
| Capacitors **46** and **77** | 0.01 microfarad. |
| Capacitor **57** | 0.1 microfarad. |
| Tube **53** | Type 5842. |
| Tube **62** | Type EFP–60. |
| Rectifiers **42**, **64** and **68** | Type IN34A. |
| Potential source **43** | +150 volts. |
| Potential source **56** | −100 volts. |
| Potential source **70** | +250 volts. |

Although the arrangements of the present invention which have been shown in the drawings and described in detail hereinabove utilize a pair of devices at least one of which has a current-voltage characteristic a bounded portion of which has a negative slope, it will be understood that the invention is not limited to the use of separate devices. It would be within the scope of the present invention, for example, to replace the pair of devices with a single device capable of functioning in substantially the same manner.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. The combination comprising: first and second devices, said devices comprising positive-gap diodes having different current-voltage characteristics, each of said characteristics having two stable regions and at least one of said characteristics having a bounded portion with a negative slope; means for coupling said devices to provide a circuit having a characteristic with four stable states comprised of combinations of said four stable regions; means for applying input signals of different magnitudes to said circuit whereby it assumes one of said four states; and output means associated with each of said devices for providing a manifestation of the stable-region condition of the corresponding device.

2. The combination comprising: first and second devices, said devices comprising positive-gap diodes having different current-voltage characteristics, each of said characteristics having two stable regions and having a bounded portion with a negative slope; means for coupling said devices to provide a circuit having a characteristic with four stable states comprised of combinations of said four stable regions; means for applying input signals of different magnitudes to said circuit whereby it assumes one of said four states; and output means associated with each of said devices for providing a manifestation of the stable-region condition of the corresponding device.

3. The combination comprising: first and second devices having different current-voltage characteristics, each of said characteristics having two stable regions and said second device comprising a secondary-emission pentode utilizing positive feedback to provide a bounded negative-resistance portion in its said characteristic; means for coupling said devices to provide a circuit having a characteristic with four stable states comprised of combinations of said four stable regions; means for applying input signals of different magnitudes to said circuit whereby it assumes one of said four states; and output means associated with each of said devices for providing a manifestation of the stable-region condition of the corresponding device.

4. The combination comprising: first and second devices having different current-voltage characteristics, each of said characteristics having two stable regions, said first device comprising a sharp-cutoff electron tube and said second device comprising a secondary-emission pentode utilizing positive feedback to provide a bounded negative-resistance portion in its said characteristic; means for coupling said devices to provide a circuit having a characteristic with four stable states comprised of combinations of said four stable regions; means for applying input signals of different magnitudes to said circuit whereby it assumes one of said four states; and output means associated with each of said devices for providing a manifestation of the stable-region condition of the corresponding device.

5. The combination comprising first and second devices, said devices comprising diodes having different current-voltage characteristics, each of said characteristics having two stable regions and at least one of said characteristics having a bounded portion with a negative slope; means for coupling said device to provide a circuit having a composite current-voltage characteristic with four stable states comprised of combinations of said four stable regions; means for applying input signals of different magnitudes to said circuit whereby it assumes one of said four states; and output means associated with each of said devices for providing a manifestation of the stable region condition of the corresponding device.

6. The combination comprising first and second devices, each having two terminals and each device having between its two terminals a current-voltage characteristic with two stable regions and a negative resistance region; means for coupling said devices to provide a circuit having a current-voltage characteristic which is a composite of the individual current-voltage characteristics of said devices, said composite current-voltage characteristic having four stable regions corresponding to respectively different magnitudes of applied signals, whereby said circuit has four stable states determined by said respectively different magnitudes of applied signals; means for applying signals of respectively different magnitudes to said circuit whereby said circuit assumes respectively one of said four states; output means associated with each of said devices for providing a manifestation of the stable region condition of the corresponding device.

7. The combination comprising first and second devices, each having two terminals and each device having between its two terminals a current-voltage characteristic with two stable regions and a negative resistance region, the characteristic of the first device being different from the characteristic of the second device; means for coupling said devices to provide a circuit having a composite current-voltage characteristic with four stable regions, said four stable regions being determined by the magnitude of applied signals and said four stable regions corresponding to combinations of the stable regions of the individual characteristics of said devices, whereby said circuit has four stable states determined by the respective magnitudes of applied signals; means for applying input signals of respectively different magnitudes to said circuit whereby said circuit assumes a respective one of said four states; output means associated with each of said devices for providing a manifestation of the stable region condition of the corresponding device.

8. The combination comprising first and second devices each having two terminals and each device having between its two terminals a current-voltage characteristic with two stable regions, the characteristic of said first device having a negative resistance region; means for coupling said devices in parallel to provide a circuit having a composite current-voltage characteristic with four stable regions, said four stable regions being determined by the respective magnitudes of applied signals and said four stable regions corresponding to combinations of the stable regions of the individual characteristics of said devices, whereby said circuit has four stable states determined by the respective magnitudes of applied signals; means for applying input signals of respectively different magnitudes to said circuit whereby said circuit assumes a respective one of said four states; output means associated with each of said device for providing a manifestation of the stable region condition of the corresponding device.

9. The combination comprising first and second devices each having two terminals and each device having between its two terminals a current-voltage characteristic with two stable regions, the characteristic of said first device having a negative resistance region; means for coupling said devices in series to provide a circuit having a composite current-voltage characteristic with four stable regions, said four stable regions being determined by the respective magnitudes of applied signals and said four stable regions corresponding to combinations of the stable regions of the individual characteristics of said devices, whereby said circuit has four stable states determined by the respective magnitudes of applied signals; means for applying input signals of respectively different magnitudes to said circuit whereby said circuit assumes a respective one of said four states; output means associated with each of said device for providing a manifestation of the stable region condition of the corresponding device.

10. Apparatus for adding numerical values expressed in binary notation comprising first and second devices each having two terminals and having different current-voltage characteristics between said terminals, each of said characteristics having two stable regions and said characteristic of only said second device having a bounded portion with a negative slope; means for coupling said devices to provide a circuit having a composite characteristic with four stable regions corresponding to four different magnitudes of applied signals, said four stable regions of said composite characteristic comprising combinations of the stable regions of the individual current-voltage characteristics of said first and second devices whereby said circuit has four stable states determined by the magnitudes of applied signals; means for applying input signals having different values corresponding respectively to the presence of 0, 1, 2, or 3 input pulses comprising the numerical values in binary notation to be added to said circuit whereby it assumes a corresponding one of said four states; output means associated with said first device for providing a sum output signal only when said first device is in its second stable region due to the presence of 1 or 3 input pulses; and output means associated with said second device for providing a carry output signal only when said output device is in its second output stable region due to the presence of 2 or 3 input pulses.

References Cited in the file of this patent

UNITED STATES PATENTS

| | | |
|---|---|---|
| 2,404,250 | Rajchman | July 16, 1946 |
| 2,521,787 | Grosdoff | Sept. 12, 1950 |
| 2,871,401 | Sternbeck et al. | Jan. 27, 1959 |
| 2,895,673 | Williams | July 21, 1959 |

FOREIGN PATENTS

| | | |
|---|---|---|
| 166,162 | Australia | Nov. 29, 1955 |
| 166,800 | Australia | Feb. 6, 1956 |
| 742,523 | Great Britain | Dec. 30, 1955 |
| 748,546 | Great Britain | May 2, 1956 |

OTHER REFERENCES

Pub. I Williams, "A Method of Designing Transistor Trigger Circuits," Proc. of Institution of Elec. Eng. (British), vol. 100, part III, 1953, pgs. 242, 243 relied on.